United States Patent
Yi et al.

(10) Patent No.: US 12,535,093 B2
(45) Date of Patent: Jan. 27, 2026

(54) TOLERANCE COMPENSATION FASTENING ASSEMBLY AND FASTENING SYSTEM COMPRISING SAME

(71) Applicant: Illinois Tool Works Inc., Glenview, IL (US)

(72) Inventors: Penghui Yi, Shanghai (CN); Bin Chen, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 279 days.

(21) Appl. No.: 18/386,450

(22) Filed: Nov. 2, 2023

(65) Prior Publication Data

US 2024/0175458 A1 May 30, 2024

(30) Foreign Application Priority Data

Nov. 24, 2022 (CN) .......................... 202211483643.7

(51) Int. Cl.
*F16B 5/02* (2006.01)

(52) U.S. Cl.
CPC ............ *F16B 5/025* (2013.01); *F16B 5/0233* (2013.01)

(58) Field of Classification Search
CPC .......... F16B 5/02; F16B 5/025; F16B 5/0233; F16B 5/0216; F16B 5/0225; F16B 5/0258; F16B 5/0283; F16B 5/04; F16B 5/06; F16B 5/0628
See application file for complete search history.

(56) References Cited

U.S. PATENT DOCUMENTS

| 8,240,945 | B2 * | 8/2012 | Aoum ................. F16B 35/041 403/365 |
| 11,002,303 | B2 * | 5/2021 | Owens, II ................. F16B 5/02 |
| 2007/0009342 | A1 * | 1/2007 | Figge ...................... F16B 5/025 411/546 |
| 2009/0190993 | A1 * | 7/2009 | De Gelis ............... F16B 5/0233 403/47 |

(Continued)

*Primary Examiner* — Daniel J Wiley
(74) *Attorney, Agent, or Firm* — McAndrews, Held & Malloy, Ltd.

(57) ABSTRACT

The present disclosure provides a tolerance compensation fastening assembly for fastening a second part to a first part by cooperating with a nut element provided on the first part. The tolerance compensation fastening assembly comprises a bolt, a compensation element, a connection element, and a holding means. The compensation element comprises a body and a flange, and the flange is provided at one end of the body and defines a compensation hole in communication with a channel of the body. A bolt head is accommodated in the channel and is blocked by the flange, and a bolt rod passes through the compensation hole. The connection element comprises a connection disc and connection legs, and the flange is located between the bolt head and the connection disc. The connection disc is provided with a connection hole to receive the bolt rod. The connection legs are configured to connect the connection disc to the second part. The holding means is provided on the connection disc and the bolt rod, and is configured to couple the bolt rod to the connection disc to prevent the bolt rod from being withdrawn from the connection hole, thereby holding the bolt, the compensation element and the connection element in a pre-assembled position.

12 Claims, 9 Drawing Sheets

(56) References Cited

U.S. PATENT DOCUMENTS

| | | | |
|---|---|---|---|
| 2010/0303582 A1* | 12/2010 | Choi | B62D 27/065 |
| | | | 411/372.6 |
| 2020/0332825 A1* | 10/2020 | Mosch | F16B 37/12 |
| 2022/0049739 A1* | 2/2022 | Radanovic | F16B 43/00 |
| 2022/0290705 A1* | 9/2022 | Mücke | F16B 5/0233 |
| 2022/0373010 A1* | 11/2022 | Bente | F16B 43/00 |

* cited by examiner

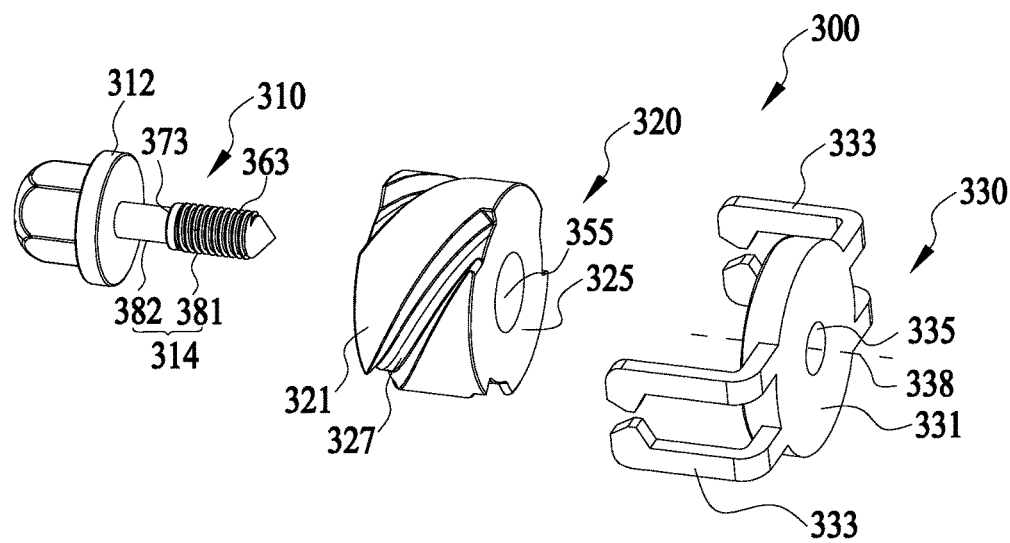
Fig. 3A
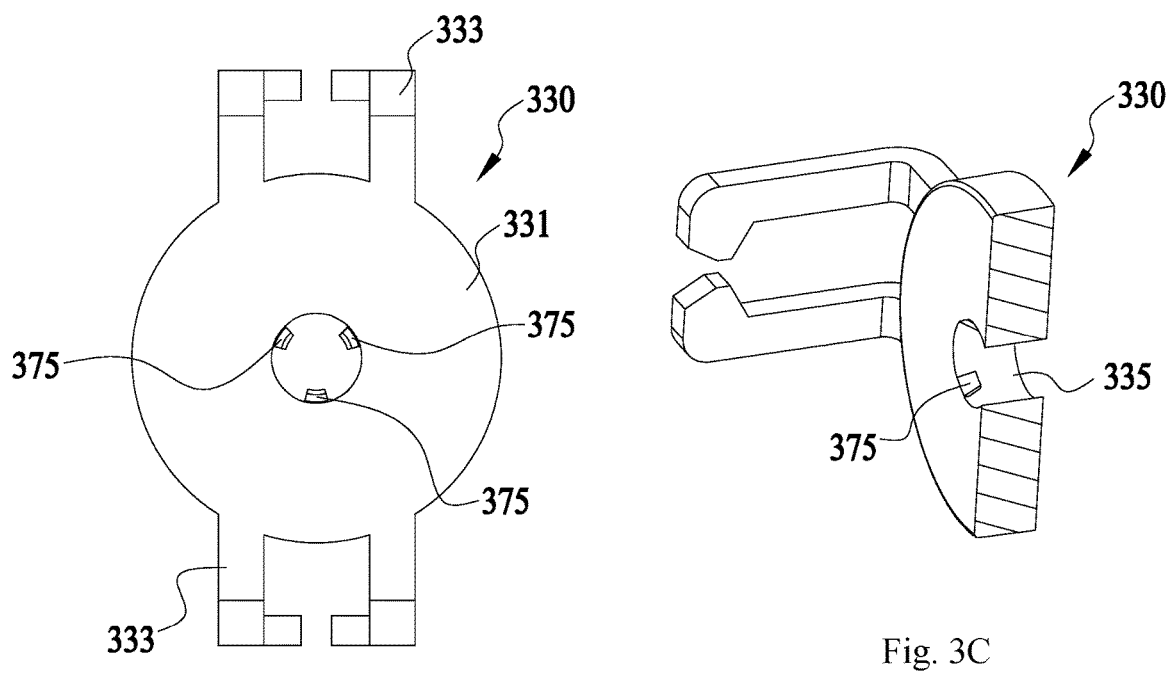
Fig. 3B
Fig. 3C

TOLERANCE COMPENSATION FASTENING ASSEMBLY AND FASTENING SYSTEM COMPRISING SAME

RELATED APPLICATION

The present application claims the benefit of Chinese Patent Application No. 2022114836437, filed Nov. 24, 2022, titled "Tolerance Compensation Fastening Assembly and Fastening System Comprising Same," the contents of which are hereby incorporated by reference.

TECHNICAL FIELD

Embodiments of the present disclosure generally relate to a tolerance compensation fastening assembly, and more particularly, to a fastening assembly configured to fasten two components together and be capable of compensating for a tolerance, and a fastening system comprising the fastening assembly.

BACKGROUND

A fastening system with a tolerance compensating function can compensate for tolerances caused by manufacturing and/or mounting, etc. while two components are fastened. Such a fastening system generally comprises mutually cooperating threaded fastening elements, such as bolts and nuts, and fastening between components is realized by a torque of the threaded fastening elements.

SUMMARY

The present disclosure relates generally to a tolerance compensation fastening assembly, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

FIG. 3A is an exploded view of a tolerance compensation fastening assembly according to another embodiment of the present disclosure.

FIG. 3B is a side view of a connecting element of the tolerance compensation fastening assembly shown in FIG. 3A.

FIG. 3C is a perspective sectional view of the connecting element shown in FIG. 3B.

DETAILED DESCRIPTION

Figure 1A:
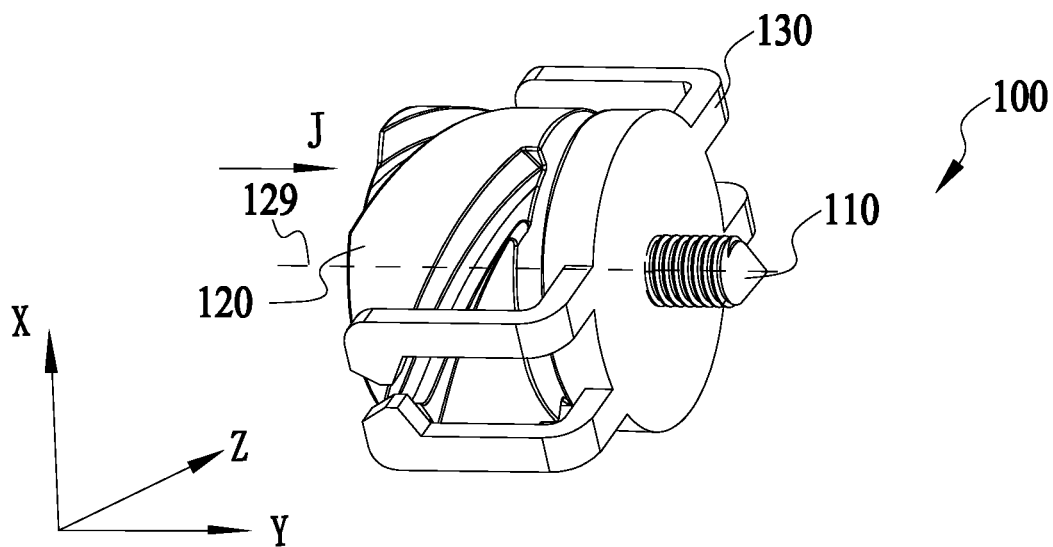
FIG. 1A is a perspective view of a tolerance compensation fastening assembly according to an embodiment of the present disclosure as viewed from right to left.

Various specific embodiments of the present disclosure will be described below with reference to the accompanying drawings which form a part of this description. It should be understood that although the terms indicating directions, such as "front", "rear", "upper", "lower", "left", "right", "top", and "bottom" are used in the present disclosure to describe structural parts and elements in various examples of the present disclosure, these terms are used herein only for ease of illustration and are determined based on the exemplary orientations shown in the accompanying drawings. Since the embodiments disclosed in the present disclosure can be arranged in different directions, these terms indicating directions are merely illustrative and should not be considered as limitations.

According to a first aspect of the present disclosure, the present disclosure provides a tolerance compensation fastening assembly for fastening a second part to a first part by cooperating with a nut element provided on the first part. The tolerance compensation fastening assembly comprises a bolt, a compensation element, a connection element, and a holding means. The bolt comprises a bolt head and a bolt rod, and the bolt rod is provided with an external thread for engagement with the nut element. The compensation element comprises a body and a flange, the body having an axis and a channel extending along the axis, the flange being provided at one end of the body, and the flange extending from the body toward the axis and defining a compensation hole in communication with the channel, wherein the bolt head is accommodated in the channel and is blocked by the flange, and the bolt rod passes through the compensation hole. The connection element comprises a connection disc and connection legs provided on the connection disc, the connection disc being arranged such that the flange of the compensation element is located between the bolt head and the connection disc, the connection disc being provided with a connection hole to receive a portion of the bolt rod extending from the compensation hole, and the connection legs being configured to connect the connection disc to the second part. The holding means is provided on the connection disc and the bolt rod, and is configured to couple the bolt rod to the connection disc to prevent the bolt rod from being withdrawn from the connection hole, thereby holding the bolt, the compensation element and the connection element in a pre-assembled position.

In the tolerance compensation fastening assembly according to the first aspect described above, the holding means comprises an internal thread provided on a wall of the connection hole of the connection element, and the external thread provided on the bolt rod, the internal thread being configured to engage with the external thread.

In the tolerance compensation fastening assembly according to the first aspect described above, the holding means comprises at least one biasing arm provided in the connection hole of the connection element and a step surface provided on the bolt rod, the at least one biasing arm being configured to be biased by the bolt rod when the bolt rod is inserted in the connection hole in an insertion direction toward the pre-assembled position and to abut against the step surface of the bolt rod when the bolt rod reaches the pre-assembled position.

In the tolerance compensation fastening assembly according to the first aspect described above, a proximal end of each of the at least one biasing arm is connected to the wall of the connection hole, a distal end thereof being free end, and the biasing arm extending from the proximal end to the distal end thereof in a direction gradually away from the compensation element and toward a center axis of the connection hole. The distal end of the biasing arm abuts against the step surface of the bolt rod when the bolt rod reaches the pre-assembled position.

In the tolerance compensation fastening assembly according to the first aspect described above, the at least one biasing arm comprises three biasing arms being uniformly arranged around the center axis of the connection hole.

In the tolerance compensation fastening assembly according to the first aspect described above, the bolt rod comprises a first rod portion and a second rod portion located between the first rod portion and the bolt head, the external thread being provided on the first rod portion. The radial dimension of the second rod portion is smaller than the radial dimension of the first rod portion to form the step surface between the first rod portion and the second rod portion.

In the tolerance compensation fastening assembly according to the first aspect described above, each of the at least one biasing arm extends in a direction perpendicular to the center axis of the connection hole with a proximal end thereof being connected to the wall of the connection hole and a distal end thereof being free end, each of the at least one biasing arm comprising a projection extending toward the center axis of the connection hole, wherein the projection abuts against the step surface of the bolt rod when the bolt rod reaches the pre-assembled position.

In the tolerance compensation fastening assembly according to the first aspect described above, the at least one biasing arm comprises a first biasing arm and a second biasing arm. The first biasing arm and the second biasing arm are connected to the wall of the connection hole by respective proximal ends on opposite sides of the center axis of the connection hole. The first biasing arm and the second biasing arm respectively comprise a first projection and a second projection extending toward the center axis of the connection hole. The first projection and the second projection abut against the step surface of the bolt rod when the bolt rod reaches the pre-assembled position.

In the tolerance compensation fastening assembly according to the first aspect described above, the connection hole is substantially rectangular and comprises a pair of length walls and a pair of width walls. The proximal ends of the first biasing arm and the second biasing arm are respectively connected to the pair of length walls, and the distal ends of the first biasing arm and the second biasing arm are respectively spaced at a distance from the adjacent length walls. The first biasing arm and the second biasing arm extend substantially in an extending direction of the pair of width walls.

In the tolerance compensation fastening assembly according to the first aspect described above, the bolt comprises a protrusion extending around the bolt rod, wherein a side of the protrusion facing the bolt head forms the step surface.

In the tolerance compensation fastening assembly according to the first aspect described above, the compensation hole is dimensioned such that the bolt rod is movable in the compensation hole in a longitudinal direction Y and in at least one transverse direction X, Z perpendicular to the longitudinal direction Y. The compensation element is configured to be connectable to the second part and movable in the longitudinal direction Y relative to the second part. The connection legs are configured to enable the connection disc to move in the at least one transverse direction X, Z perpendicular to the longitudinal direction Y relative to the second part and to prevent the compensation element from disengaging from the second part during movement in the longitudinal direction Y toward the first part.

According to a second aspect of the present disclosure, the present disclosure provides a tolerance compensation fastening system for fastening a second part to a first part. The tolerance compensation fastening system comprises a nut element provided on the first part, and a tolerance compensation fastening assembly according to the first aspect described above. The bolt rod of the bolt of the tolerance compensation fastening assembly engages the nut element to fasten the second part to the first part.

An embodiment of the present disclosure relates to a fastening assembly having a tolerance compensation function, and various components of the fastening assembly can be pre-assembled together before use. A tolerance compensation fastening assembly is configured to fasten a second part 220 (as shown in FIG. 2A) to a first part 210 by cooperating with a nut element 215 (as shown in FIG. 2A) provided on the first part 210.

Figure 1B:
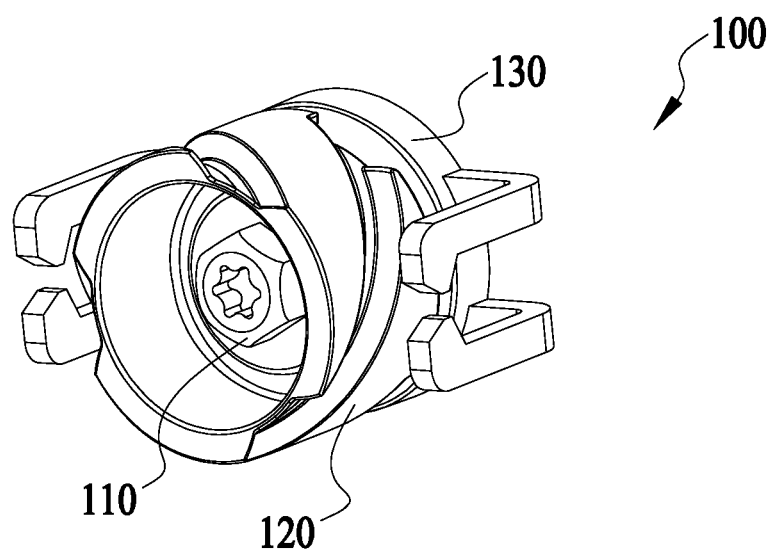
FIG. 1B is a perspective view of the tolerance compensation fastening assembly shown in FIG. 1A, as viewed from left to right.
Figure 1C:
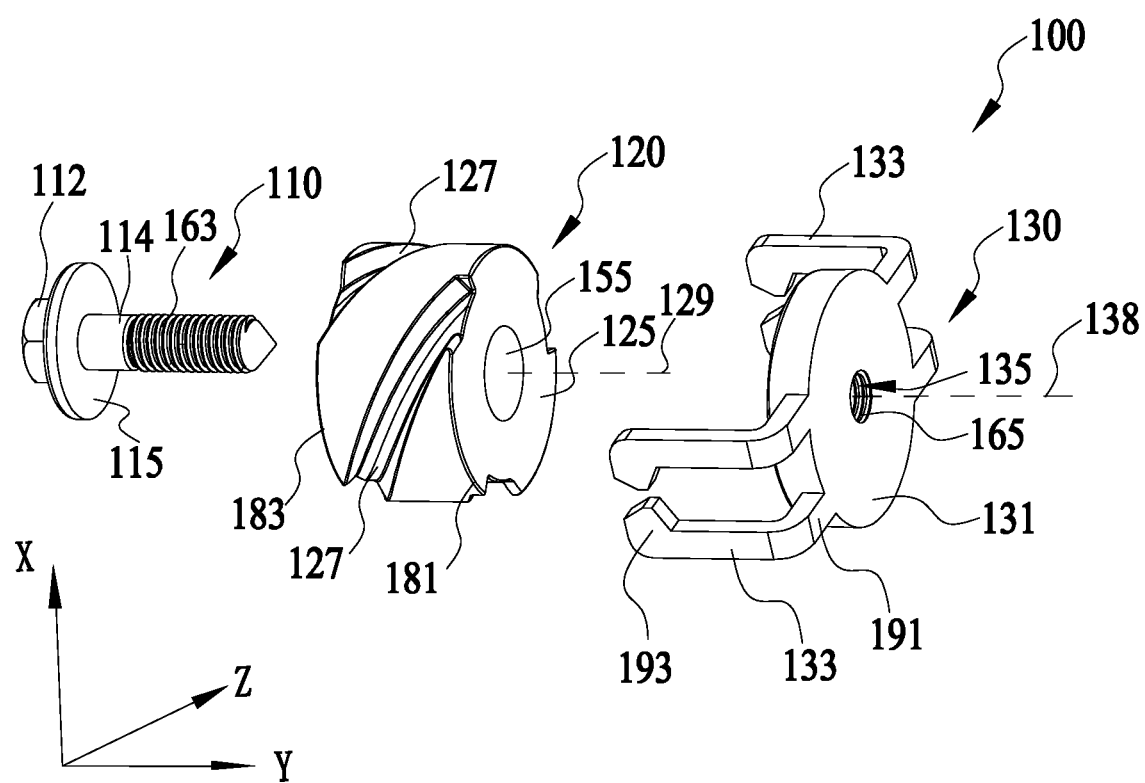
FIG. 1C is an exploded view of the tolerance compensation fastening assembly shown in FIG. 1A.
Figure 1D:
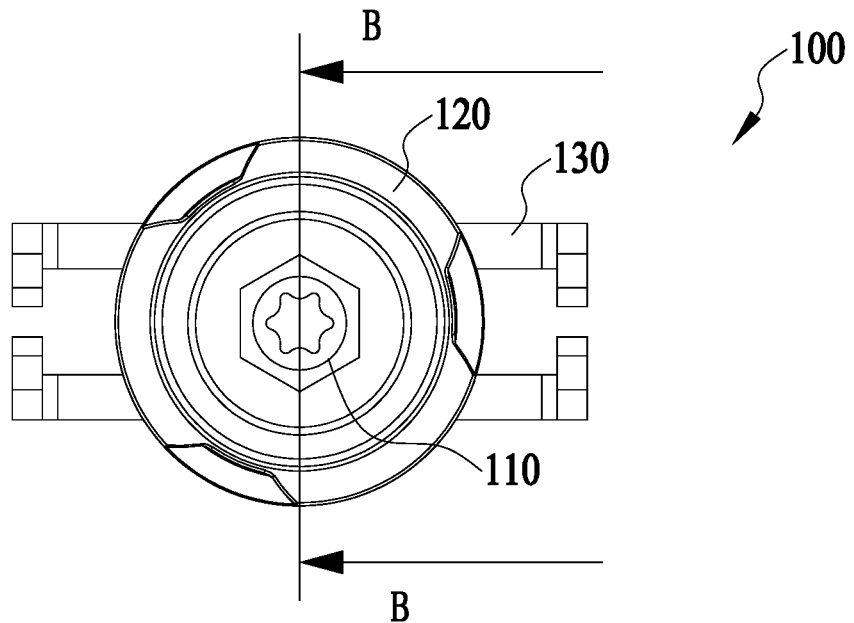
FIG. 1D is a left view of the tolerance compensation fastening assembly shown in FIG. 1A in a pre-assembled state.
Figure 1E:
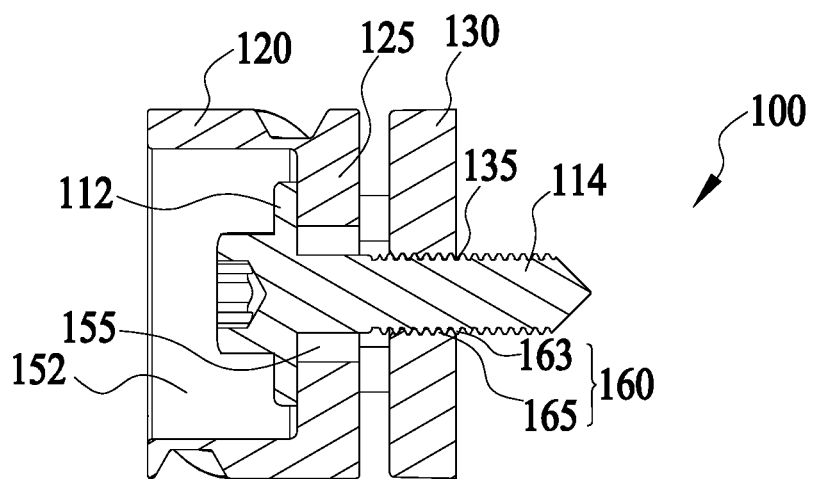
FIG. 1E is a sectional view taken along line B-B in FIG. 1D.

FIGS. 1A-1E show a specific structure of a tolerance compensation fastening assembly 100 according to an embodiment of the present disclosure, wherein FIG. 1A is a perspective view of a tolerance compensation fastening assembly 100 as viewed from right to left; FIG. 1B is a perspective view of the tolerance compensation fastening assembly 100 as viewed from left to right; FIG. 1C is an exploded view of the tolerance compensation fastening assembly 100; FIG. 1D is a left view of the tolerance compensation fastening assembly 100 in a pre-assembled state; and FIG. 1E is a sectional view taken along line B-B in FIG. 1D.

As shown in FIGS. 1A and 1B, the tolerance compensation fastening assembly 100 comprises a bolt 110, a compensation element 120, and a connection element 130. The bolt 110 is inserted into the compensation element 120 and the connection element 130 in an insertion direction J substantially parallel to a longitudinal direction Y. The compensation element 120 is used for threaded connection with the second part 220 (as shown in FIG. 2A) and can move in the longitudinal direction Y relative to the second part 220. The connection element 130 is configured to connect to the second part 220, and can move relative to the second part 220 in transverse directions X, Z perpendicular to the longitudinal direction Y. Moreover, the connection element 130 can prevent the compensation element 120 from disengaging from the second part 220 during movement in the longitudinal direction Y toward the first part 210. Therefore, the tolerance compensation fastening assembly 100 can compensate for a tolerance of the first part 210 (as shown in FIG. 2A) and the second part 220 in the longitudinal direction Y, and can compensate for tolerances of the first part 210 and the second part 220 in the transverse directions X, Z. Of course, the tolerance compensation fastening assembly 100 may also be configured to compensate for only the tolerance in one transverse direction X or Z.

Figure 2A:
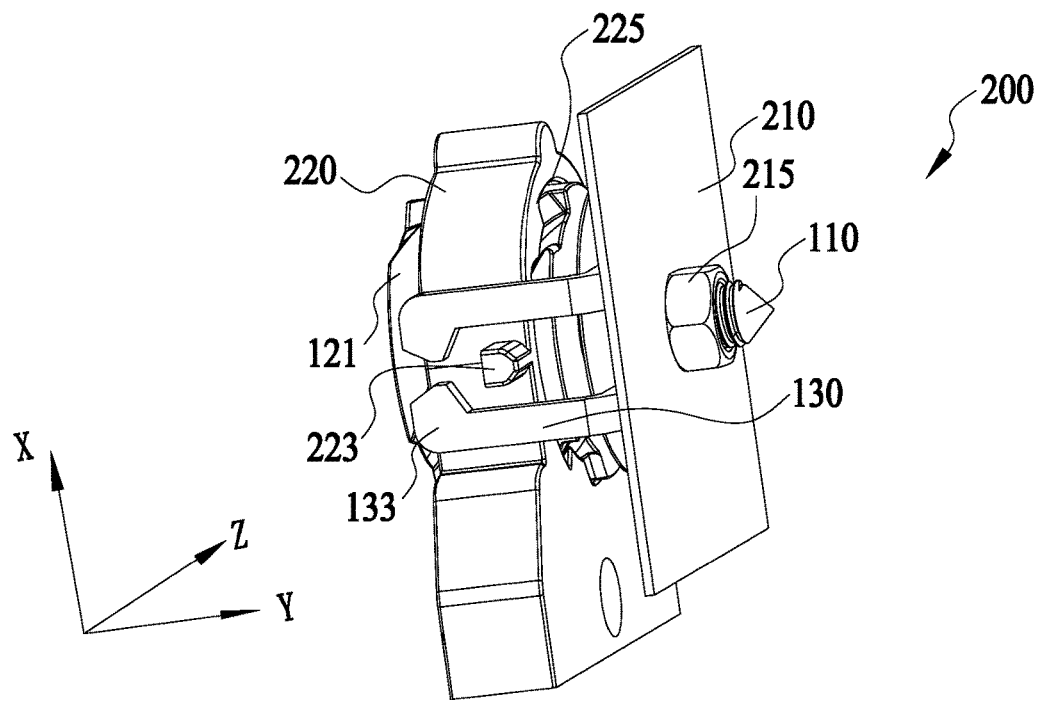
FIG. 2A is a perspective view of a fastening system comprising the tolerance compensation fastening assembly shown in FIG. 1A in a usage state.

As shown in FIG. 1C, the bolt 110 comprises a bolt head 112 and a bolt rod 114, and the bolt rod 114 is provided with an external thread 163 for engagement with the nut element 215 (as shown in FIG. 2A) provided on the first part 210. The compensation element 120 comprises a body 121, which is substantially cylindrical, and a threaded connection portion 127 is provided on an outer surface of the body and is used for threaded connection with the second part 220. The body 121 has an axis 129 and defines a channel 152 (see FIG. 1E) extending along the axis 129. The body 121 further comprises two opposite axial ends, namely, a first axial end 181 and a second axial end 183. In the insertion direction J of the bolt 110, the first axial end 181 is located downstream of the second axial end 183. The compensation element 120 further comprises a flange 125 provided at the first axial end 181 of the body 121, and the flange 125 extends from the body 121 toward the axis 129. The flange 125 is annular and defines a compensation hole 155, and the compensation hole 155 is in communication with the channel 152 of the body 121. The compensation hole 155 is dimensioned such that the bolt head 112 is blocked by the flange 125 and cannot enter the compensation hole 155, but the bolt rod 114 can enter the compensation hole 155. Moreover, the compensation hole 155 is further dimensioned such that the bolt rod 114 is movable in the compensation hole 155 in the longitudinal direction Y and in at least one transverse direction X, Z perpendicular to the longitudinal direction Y.

In the embodiment shown in FIG. 1C, the bolt head 112 comprises a bottom portion 115 with a larger diameter, and the radial dimension of the bottom portion 115 is greater than the radial dimension of the compensation hole 155, such that the bolt head 112 cannot enter the compensation hole 155. It should be noted that although in the embodiment shown in FIG. 1C, the bottom portion 115 and the rest of the bolt head 112 form a whole, in other embodiments, the bottom portion 115 may also be formed separately from other parts of the bolt head 112, that is, the bottom portion 115 forms a washer-like component, which still falls within the scope of protection of the present disclosure.

As still shown in FIG. 1C, the connection element 130 comprises a connection disc 131 and connection legs 133 provided on the connection disc 131. The connection disc 131 is substantially disc-shaped, and is provided with a connection hole 135 penetrating through the connection disc 131 to receive a portion of the bolt rod 114 extending from the compensation hole 155 of the compensation element 120. The connection hole 135 has a center axis 138.

The connection legs 133 are configured to connect the connection disc 131 to the second part 220. There may be a plurality of connection legs 133, and each of the connection legs 133 extends substantially along the center axis 138 of the connection hole 135. A proximal end 191 of each of the connection legs 133 is connected to the connection disc 131, and a distal end 193 thereof forms a hook shape so as to be able to hook a column 223 (as shown in FIG. 2A) on the second part 220. In the embodiment shown in the figure, two connection legs 133 are provided on each of a first side and a second side of the connection disc 131 opposite to each other, and the distal ends 193 of the two connection legs 133 are bent toward each other to form the hook shape, so as to jointly enclose the column 223 on the second part 220. By means of a joint action of the connection legs 133 and the column 223 on the second part 220, the connection disc 131 can move in the longitudinal direction Y relative to the second part 220, but will not disengage from the second part 220 meanwhile, the connection element 130 can prevent the compensation element 120 from disengaging from the second part 220 during movement in the longitudinal direction Y toward the first part 210. In addition, the connection legs 133 have elasticity, can be elastically deformed when stressed, and can be reset when a force is withdrawn. Therefore, the connection disc 131 can also move in the transverse directions X, Z relative to the second part 220. An internal thread 165 is provided on a wall of the connection hole 135 of the connection disc 131, and can engage with the external thread 163 on the bolt rod 114. The internal thread 165 on the connection disc 131 and the external thread 163 of the bolt rod 114 jointly form a holding means 160 (see FIG. 1E) of the tolerance compensation fastening assembly 100 for holding the tolerance compensation fastening assembly 110 in a pre-assembled state.

As shown in FIGS. 1D and 1E, when the tolerance compensation fastening assembly 100 is in the pre-assembled state, the bolt rod 114 of the bolt 110 sequentially passes through the channel 152 and the compensation hole 155 of the compensation element 120, and then enters the connection hole 135 of the connection element 130. The bolt head 112 of the bolt 110 enters the channel 152, but is blocked by the flange 125 and cannot enter the compensation hole 155, so that the flange 125 is held between the bolt head 112 and the connection disc 131. The connection element 130 and the bolt rod 114 are coupled together by the action of the holding means 160 (i.e., the external thread 163 of the bolt rod 114 and the internal thread 165 on the connection disc 131), so that the bolt rod 114 cannot be withdrawn from the connection hole 135 in a direction opposite to the insertion direction J. Thus, the components of the tolerance compensation fastening assembly 100 (i.e., the bolt 110, the compensation element 120, and the connection element 130) are held in a pre-assembly position by the holding means 160 to prevent the components from being separated from each other.

In addition, the holding means 160 is also configured to allow the bolt rod 114 to move in the insertion direction J relative to the connection hole 135 when the tolerance compensation fastening assembly 100 is in the pre-assembly position, so that the tolerance compensation fastening assembly 100 in the pre-assembly position can be further operated, and thus the tolerance compensation fastening assembly can fasten the first part 210 to the second part 220. The holding means 160 formed by the internal thread 165 on the connection disc 131 and the external thread 163 of the bolt rod 114 can realize the above functions, because the engagement of the internal thread 165 and the external thread 163 does not prevent the bolt 110 from moving in the insertion direction J relative to the connection hole 135.

In the embodiments shown in FIGS. 1A-1D, since the tolerance compensation fastening assembly 100 can be held in the pre-assembly position by the holding means 160, and the tolerance compensation fastening assembly 100 will not be scattered during storage, transportation and use, so that an operator can easily identify all components contained in the tolerance compensation fastening assembly 100 when using the tolerance compensation fastening assembly 100, and thereby realize a correct fastening operation. In addition, in the embodiments shown in FIGS. 1A-1D, a part of the holding means is formed by an existing thread on the bolt rod, and the other part thereof can be obtained only by providing the thread in the connection hole 135 of the connection disc 131, thus the holding means is not only simple to arrange, but also easy to process and operate.

Figure 2B:
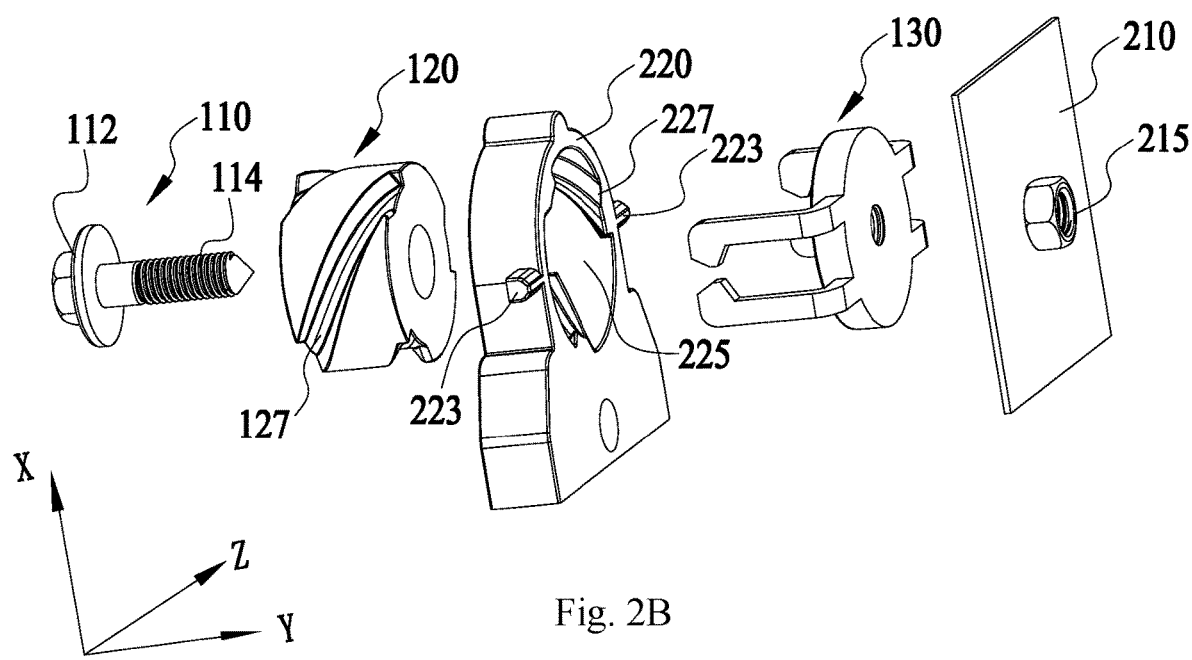
FIG. 2B is an exploded view of FIG. 2A.
Figure 2C:
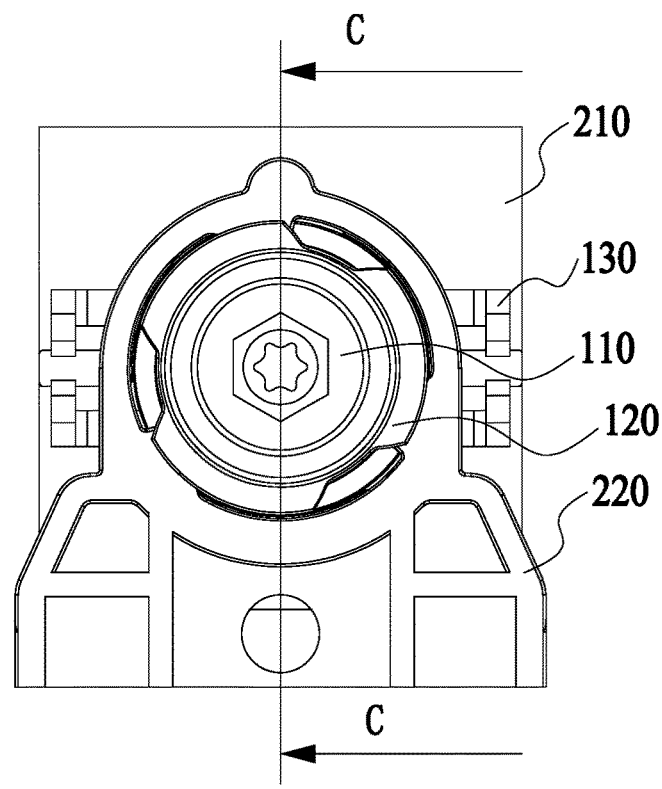
FIG. 2C is a left view of FIG. 2A.
Figure 2D:
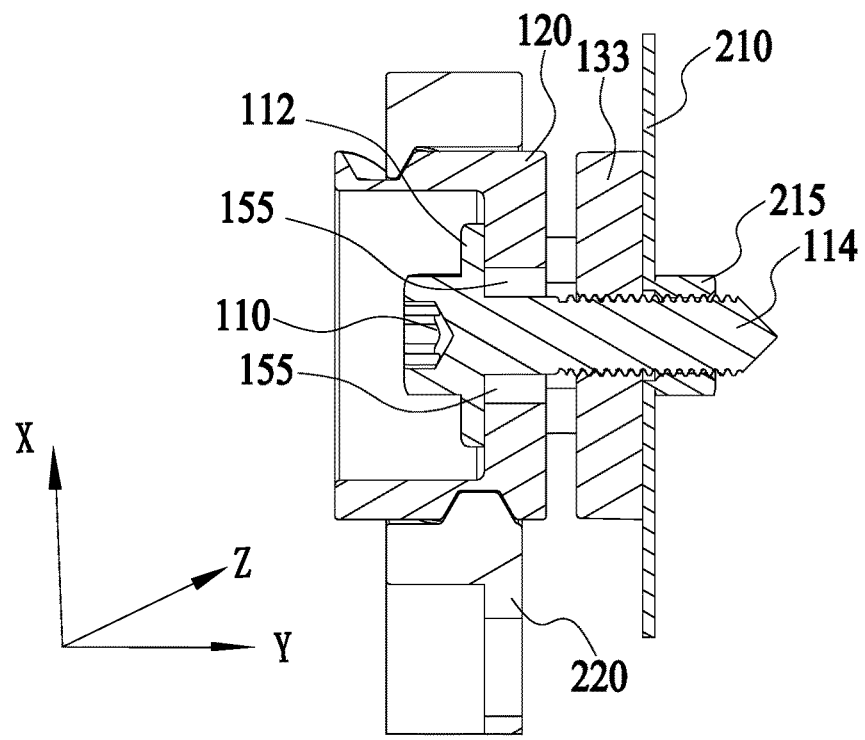
FIG. 2D is a sectional view taken along line C-C in FIG. 2C.

FIGS. 2A-2D show a usage state of a fastening system 200 comprising a tolerance compensation fastening assembly 100, wherein FIG. 2A is a perspective view of the fastening system 200 in the usage state, FIG. 2B is an exploded view of FIG. 2A, FIG. 2C is a left view of FIG. 2A, and FIG. 2D is a sectional view taken along line C-C in FIG. 2C. The fastening system 200 is configured to fasten a first part 210 to a second part 220.

As shown in FIGS. 2A and 2B, the first part 210 is provided with a nut element 215 on a side of the first part 210 facing away from the second part 220. The second part 220 is provided with a receiving hole 225, and a threaded connection portion 227 is provided on a wall of the receiving hole 225. The second part 220 is further provided with columns 223 on its two opposite sides. The fastening system 200 comprises the tolerance compensation fastening assembly 100 and the nut element 215 provided on the first part 210. The nut element 215 engages with the bolt rod 114 of the bolt 110.

As shown in FIGS. 2C and 2D, the threaded connection portion 127 on the compensation element 120 of the tolerance compensation fastening assembly 100 engages with the threaded connection portion 227 on the second part 220 to movably connect the compensation element 120 to the second part 220, that is, the compensation element 120 can move in the longitudinal direction Y relative to the second part 220. The connection element 130 of the tolerance compensation fastening assembly 100 hooks the column 223 (as shown in FIG. 2A) on the second part 220 by means of its connection legs 133, so that the compensation element 120 can be prevented from disengaging from the second part 220 when moving toward the first part 210. When the compensation element 120 moves away from the first part 210, the compensation element 120 is prevented from disengaging from the second part 220 by the cooperation between the bolt head 112 of the bolt 110 and the flange 125 of the compensation element 120. When the bolt rod 114 is tightened to the nut element 215, the first part 210 and the second part 220 are fastened relative to each other by the tolerance compensation fastening assembly 100.

During fastening of the first part 210 to the second part 220 by means of the fastening system 200, the tolerance compensation fastening assembly 100 is first assembled to the second part 220, the compensation element 120 is in threaded connection with the threaded connection portion 227 of the second part 220, the connection legs 133 of the connection element 130 are connected to the column 223 of the second part 220, then the bolt 110 is inserted into the nut element 215 of the first part 210, and a fastened connection between the first part 210 and the second part 220 can be realized by tightening the bolt 110. During connection of the first part 210 to the second part 220 by means of the bolt 110, the tolerance compensation between the first part 210 and the second part 220 can be realized by the tolerance compensation fastening assembly 100. Specifically, since the compensation element 120 can move in the longitudinal direction Y relative to the second part 220, the tolerance of the first part 210 and the second part 220 in the longitudinal direction Y can be compensated for by adjusting the position of the compensation element 120 relative to the second part 220 in the longitudinal direction Y. Since the bolt 110 can move in the compensation hole 155 of the compensation element 120 in the transverse directions X, Z, and since the connection disc 133 can move in the transverse directions X, Z relative to the second part 220, the tolerances of the first part 210 and the second part 220 in the transverse directions X, Z can be compensated for by adjusting the relative positions of the bolt 110 and the second part 220 in the transverse directions X, Z.

FIG. 3A is an exploded view of a tolerance compensation fastening assembly 300 according to another embodiment of the present disclosure. The tolerance compensation fastening assembly 300 shown in FIG. 3A is substantially similar to the tolerance compensation fastening assembly 100 shown in FIGS. 1A-1E except only that a holding means 360 of the tolerance compensation fastening assembly 300 is different from the holding means 160 of the tolerance compensation fastening assembly 100. Specifically, the holding means 160 of the tolerance compensation fastening assembly 100 is formed by the internal thread 165 on the connection disc 131 and the external thread 163 of the bolt rod 114, while the holding means 360 of the tolerance compensation fastening assembly 300 is formed by a biasing arm 375 provided in a connection hole 335 of a connection element 330 and a step surface 373 provided on a bolt rod 314.

Figure 3D:
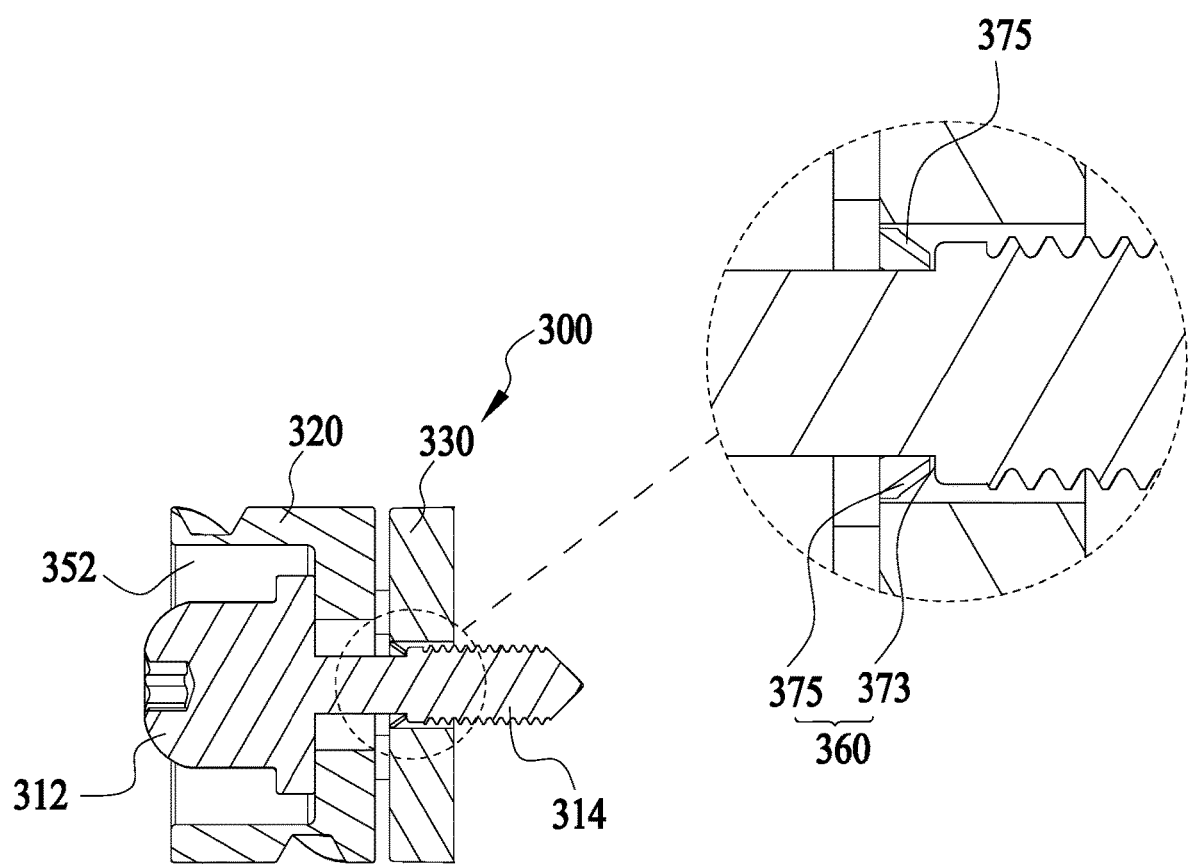
FIG. 3D is a sectional view of the tolerance compensation fastening assembly shown in FIG. 3A taken along an axis in a pre-assembly position.

Specifically, as shown in FIG. 3A, the tolerance compensation fastening assembly 300 comprises a bolt 310, a compensation element 320, and a connection element 330. The compensation element 320 has the same structure as the compensation element 120 of the tolerance compensation fastening assembly 100 shown in FIGS. 1A-1E, and also comprises a body 321 and a flange 325. The body 321 is provided with a threaded connection portion 327 and defines a channel 352 (see FIG. 3D), and the flange 325 defines a compensation hole 355 connected to the channel 352.

The bolt 310 is similar in structure to the bolt 110 of the tolerance compensation fastening assembly 100 shown in FIGS. 1A-1E, and also comprises a bolt head 312 and a bolt rod 314. However, the bolt rod 314 is different from the bolt rod 114 of the bolt 110 since the bolt rod 314 is provided with a step surface 373. Specifically, the bolt rod 314 comprises a first rod portion 381 and a second rod portion 382 located between the first rod portion 381 and the bolt head 312. An external thread 363 for engaging with the nut element 215 (see FIG. 2A) on the first part 210 is provided on the first rod portion 381. The radial dimension of the second rod portion 382 is smaller than the radial dimension of the first rod portion 381 to form the step surface 373 between the first rod portion 381 and the second rod portion 382.

FIGS. 3B and 3C show a specific structure of the connection element 330 of the tolerance compensation fastening assembly 300 in FIG. 3A, wherein FIG. 3B is a side view of the connection element 330 and FIG. 3C is a perspective sectional view of the connection element 330. As shown in FIGS. 3B and 3C, the connection element 330 is similar in structure to the connection element 130 of the tolerance compensation fastening assembly 100 shown in FIGS. 1A-1E, and also comprises a connection disc 331 with a connection hole 335 and connection legs 333 provided on the connection disc 331, and the difference only lies in that there is no thread in the connection hole 335 of the connection element 330, but biasing arms 375 are provided. There are three biasing arms 375, and the three biasing arms 375 are uniformly arranged around a center axis 338 of the connection hole 335. A proximal end of each of the biasing arms 375 is connected to a wall of the connection hole 335, a distal end thereof being free end, and each of the biasing arms 375 extending from the proximal end to the distal end thereof in a direction gradually away from the compensation element 320 and toward the center axis 338 of the connection hole 335. The biasing arm 375 thus arranged can be biased by rotating around its proximal end when stressed, and return to its initial position when a force is withdrawn. Thus, the biasing arms 375 can be biased by the first rod portion 381 of the bolt rod 314 during the insertion of the bolt rod 314 into the connection hole 335 in the insertion direction J (as shown in FIG. 1A). Of course, the number of the biasing arms is not limited to the number shown in the figure, but may be set as less than three or more than three.

FIG. 3D is a sectional view of the tolerance compensation fastening assembly shown in FIG. 3A taken along an axis in a pre-assembly position. As shown in FIG. 3A, when the tolerance compensation fastening assembly 300 is in the pre-assembly position, a distal end of the biasing arm 375 in the connection hole 335 of the connection element 330 abuts against the step surface 373 provided on the bolt rod 314 to prevent the bolt rod 314 from withdrawing from the connection hole 335 in a direction opposite to the insertion direction J. Thus, the holding means 360 formed by the biasing arm 375 provided in the connection hole 335 of the connection element 330 and the step surface 373 provided on the bolt rod 314 holds the bolt 310, the compensation element 320 and the connection element 330 in the pre-assembly position.

Figure 4A:
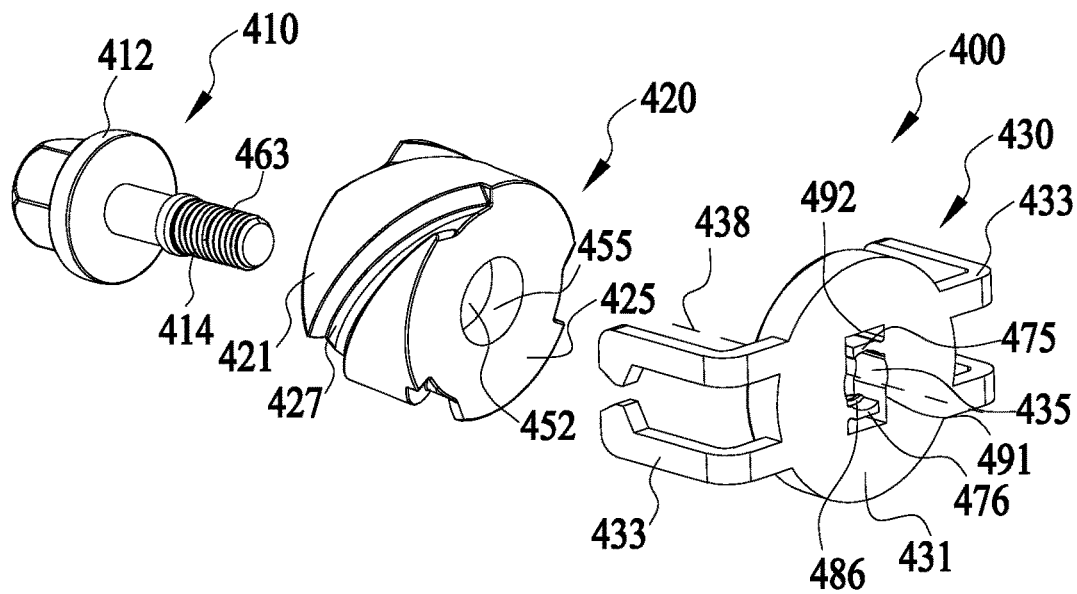
FIG. 4A is an exploded view of a tolerance compensation fastening assembly according to another embodiment of the present disclosure.

FIG. 4A is an exploded view of a tolerance compensation fastening assembly 400 according to still another embodiment of the present disclosure. The tolerance compensation fastening assembly 300 shown in FIG. 4A is substantially similar to the tolerance compensation fastening assembly 300 shown in FIG. 3A, and also forms a holding means by means of a biasing arm and a step surface, and the difference lies in that the biasing arms and the step surfaces are formed in different ways in the two embodiments.

Specifically, as shown in FIG. 4A, the tolerance compensation fastening assembly 400 comprises a bolt 410, a compensation element 420, and a connection element 430. The compensation element 420 has the same structure as the compensation element 120 of the tolerance compensation fastening assembly 100 shown in FIGS. 1A-1E, and also comprises a body 421 and a flange 425. The body 421 is provided with a threaded connection portion 427 and defines a channel 452, and the flange 425 defines a compensation hole 455 connected to the channel 452.

Figure 4B:
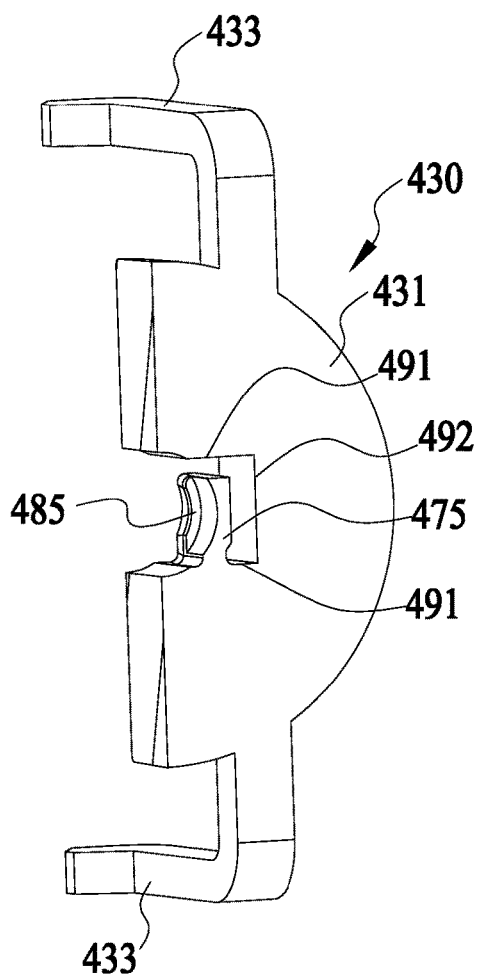
FIG. 4B is a perspective sectional view of a connecting element of the tolerance compensation fastening assembly shown in FIG. 4A.

FIG. 4B is a perspective sectional view of a connection element 430 of the tolerance compensation fastening assembly 400 in FIG. 4A. As shown in FIGS. 4B and 4A, the connection element 430 is similar in structure to the connection element 330 of the tolerance compensation fastening assembly 300 shown in FIGS. 3A-3C, and also comprises a connection disc 431 with a connection hole 435 and connection legs 433 provided on the connection disc 431, and the difference mainly lies in that the biasing arms of the connection element 430 and the biasing arms 375 of the connection element 330 are provided in different ways.

Specifically, the connection hole 435 is substantially rectangular and comprises a pair of length walls 491 and a pair of width walls 492. The biasing arms of the connection element 430 comprise a first biasing arm 475 and a second biasing arm 476. The first biasing arm 475 and the second biasing arm 476 extend substantially in an extending direction of the pair of width walls 492, and are respectively connected to the pair of length walls 491 by means of their respective proximal ends, and their distal ends each are spaced from one adjacent length wall 491 by a certain distance. The first biasing arm 475 and the second biasing arm 476 are respectively provided with a first projection 485 and a second projection 486 on sides facing each other, and the first projection 485 and the second projection 486 respectively extend from the first biasing arm 475 and the second biasing arm 476 toward a center axis 438 of the connection hole 435. The biasing arms thus arranged can be biased by rotating around their respective proximal ends when stressed, and return to their initial positions when a force is withdrawn. Thus, the first biasing arm 475 and the second biasing arm 476 can be biased by a bolt rod 414 during the insertion of the bolt rod 414 into the connection hole 435 in the insertion direction J (as shown in FIG. 1A). Of course, the number of the biasing arms is not limited to the number shown in the figure, but may be set as less than two or more than two.

Figure 4C:
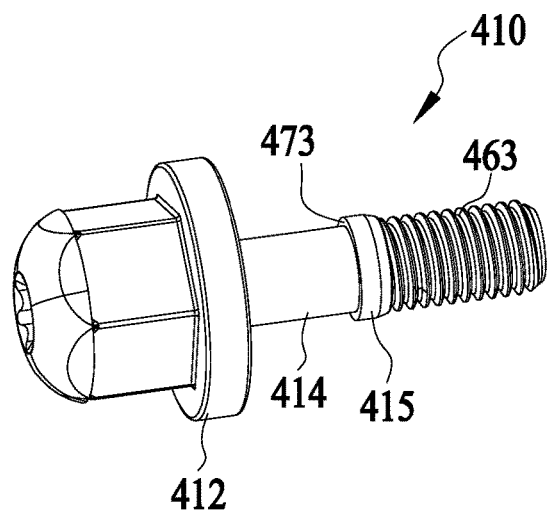
FIG. 4C is a perspective view of a bolt of the tolerance compensation fastening assembly shown in FIG. 4A.

FIG. 4C is a perspective view of a bolt 410 of the tolerance compensation fastening assembly 400 shown in FIG. 4A. As shown in FIG. 4C, the bolt 410 comprises a bolt head 412 and a bolt rod 414. An external thread 463 and a protrusion 415 extending around the bolt rod 414 are provided on the bolt rod 414. The protrusion 415 is annular and is arranged between the external thread 463 and the bolt head 412. A step surface 473 is formed on a side of the protrusion 415 facing the bolt head 412.

Figure 4D:
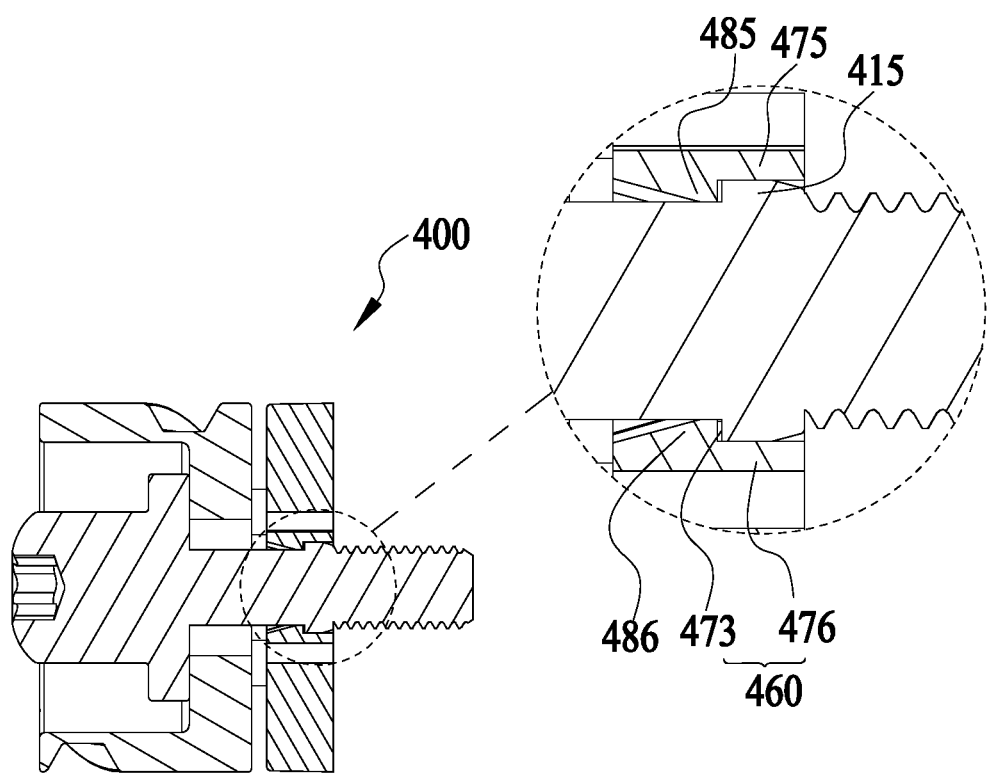
FIG. 4D is a sectional view of the tolerance compensation fastening assembly shown in FIG. 4A taken along an axis in a pre-assembly position.

FIG. 4D is a sectional view of the tolerance compensation fastening assembly 400 shown in FIG. 4A taken along an axis in a pre-assembly position. As shown in FIG. 4D, when the tolerance compensation fastening assembly 400 is in the pre-assembly position, the first projection 485 on the first biasing arm 475 and the second projection 486 on the second biasing arm 476 in the connection hole 435 of the connection element 430 abut against the step surface 473 provided on the bolt rod 414 to prevent the bolt rod 414 from withdrawing from the connection hole 435 in a direction opposite to the insertion direction J. Thus, the holding means 460 formed by the first biasing arm 475 and the second biasing arm 476 provided in the connection hole 435 of the connection element 430 and the step surface 473 provided on the bolt rod 414 holds the bolt 410, the compensation element 420 and the connection element 430 in the pre-assembly position.

Although the present disclosure is described with respect to the examples of the embodiments outlined above, various alternatives, modifications, variations, improvements, and/or substantial equivalents that are known or current or to be anticipated later may be apparent to those of at least ordinary skill in the art. Furthermore, the technical effects and/or technical problems described in this description are exemplary rather than limiting; therefore, the disclosure in this description may be used to solve other technical problems and have other technical effects and/or may solve other technical problems. Accordingly, the examples of the embodiments of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or substantial equivalents.

What is claimed is:

1. A tolerance compensation fastening assembly for fastening a second part to a first part by cooperating with a nut element provided on the first part, the tolerance compensation fastening assembly comprising:
a bolt comprising a bolt head and a bolt rod, the bolt rod being provided with an external thread for engagement with the nut element;
a compensation element comprising a body and a flange, the body having an axis and a channel extending along the axis, the flange being provided at one end of the body, the flange extending from the body towards the axis and defining a compensation hole connected to the channel, wherein the bolt head is accommodated in the channel and is blocked by the flange, and wherein the bolt rod passes through the compensation hole;
a connection element comprising a connection disc and connection legs provided on the connection disc, the connection disc being arranged such that the flange of the compensation element is located between the bolt head and the connection disc, the connection disc being provided with a connection hole to receive a portion of the bolt rod extending from the compensation hole, the connection legs being configured to connect the connection disc to the second part;
holding means being provided on the connection disc and the bolt rod and being configured to couple the bolt rod to the connection disc to prevent the bolt rod from being withdrawn from the connection hole, thereby holding the bolt, the compensation element and the connection element in a pre-assembled position.

2. The tolerance compensation fastening assembly according to claim 1, wherein:
the holding means comprises an internal thread provided on a wall of the connection hole of the connection element and the external thread provided on the bolt rod, the internal thread being configured to engage with the external thread.

3. The tolerance compensation fastening assembly according to claim 1, wherein:
the holding means comprises at least one biasing arm provided in the connection hole of the connection element and a step surface provided on the bolt rod, the at least one biasing arm being configured to be biased by the bolt rod when the bolt rod is inserted in the connection hole along an insertion direction towards the pre-assembled position and to abut against the step surface of the bolt rod when the bolt rod reaches the pre-assembly position.

4. The tolerance compensation fastening assembly according to claim 3, wherein:
a proximal end of each of the at least one biasing arm is connected to a wall of the connection hole, and a distal end thereof being free end, the biasing arm extending from the proximal end to the distal end in a direction gradually away from the compensation element and toward a center axis of the connection hole, wherein the distal end of the biasing arm abuts against the step surface of the bolt rod when the bolt rod reaches the pre-assembled position.

5. The tolerance compensation fastening assembly according to claim 4, wherein:
the at least one biasing arm comprises three biasing arms being uniformly arranged around the center axis of the connection hole.

6. The tolerance compensation fastening assembly according to claim 4, wherein:
the bolt rod comprises a first rod portion and a second rod portion arranged between the first rod portion and the bolt head, the external threads being provided on the first rod portion, a radial dimension of the second rod portion being smaller than the radial dimension of the first rod portion to form the step surface between the first rod portion and the second rod portion.

7. The tolerance compensation fastening assembly according to claim 3, wherein:
the at least one biasing arm extends in a direction perpendicular to a center axis of the connection hole with a proximal end thereof being connected to a wall of the connection hole and a distal end thereof being free end, the at least one biasing arm comprising a projection extending toward the center axis of the connection hole, wherein the projection abuts against the step surface of the bolt rod when the bolt rod reaches the pre-assembled position.

8. The tolerance compensation fastening assembly according to claim 7, wherein:
the at least one biasing arm comprises a first biasing arm and a second biasing arm, the first biasing arm and the second biasing arm connected to the wall of the connection hole by respective proximal ends on opposite sides of the center axis of the connection hole, the first biasing arm and the second biasing arm comprising a first projection and a second projection, respectively, extending toward the center axis of the connection hole, wherein the first projection and the second projection abut against the step surface of the bolt rod when the bolt rod reaches the pre-assembled position.

9. The tolerance compensation fastening assembly according to claim 8, wherein:
the connection hole is substantially rectangular and comprises a pair of length walls and a pair of width walls, the proximal ends of the first biasing arm and the second biasing arm being connected to the pair of length walls, respectively, and the distal ends of the first biasing arm and the second biasing arm being spaced at a distance from a respective adjacent length walls, wherein the first biasing arm and the second biasing arm extend substantially along the extending direction of the pair of width walls.

10. The tolerance compensation fastening assembly according to claim 7, wherein:
the bolt comprises a protrusion extending around the bolt rod, wherein a side of the protrusion facing the bolt head forms the step surface.

11. The tolerance compensation fastening assembly according to claim 1, wherein:
the compensation hole is dimensioned such that the bolt rod is movable in the compensation hole along a longitudinal direction Y and along at least one transverse direction X, Z perpendicular to the longitudinal direction Y;
the compensation element is configured to be connectable to the second part and movable in the longitudinal direction Y relative to the second part; and
the connection legs are configured to enable the connection disc to move in at least one transverse direction X, Z perpendicular to the longitudinal direction Y relative to the second part and to prevent the compensation element from disengaging from the second part during movement along the longitudinal direction Y toward the first part.

12. A tolerance compensation fastening system for fastening a second part to a first part, characterized by comprising:
 a nut element provided on the first part; and
 a tolerance compensation fastening assembly according to claim 1, wherein the bolt rod of the bolt of the tolerance compensation fastening assembly engages the nut element to fasten the second part to the first part.

* * * * *